United States Patent
Bol et al.

(10) Patent No.: US 8,927,057 B2
(45) Date of Patent: Jan. 6, 2015

(54) GRAPHENE FORMATION UTILIZING SOLID PHASE CARBON SOURCES

(75) Inventors: Ageeth A. Bol, Yorktown Heights, NY (US); Roy A. Carruthers, Stormville, NY (US); Jack O. Chu, Yorktown Heights, NY (US); Alfred Grill, Yorktown Heights, NY (US); Christian Lavoie, Yorktown Heights, NY (US); Katherine L. Saenger, Yorktown Heights, NY (US); James C. Tsang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 12/710,333

(22) Filed: Feb. 22, 2010

(65) Prior Publication Data

US 2011/0206934 A1 Aug. 25, 2011

(51) Int. Cl.
 *B05D 7/00* (2006.01)
 *C01B 31/04* (2006.01)
 *B82Y 30/00* (2011.01)
 *B82Y 40/00* (2011.01)

(52) U.S. Cl.
 CPC .............. *C01B 31/0446* (2013.01); *B82Y 30/00* (2013.01); *B82Y 40/00* (2013.01)
 USPC ........................................................ 427/227

(58) Field of Classification Search
 USPC ........................................................ 427/227
 See application file for complete search history.

(56) References Cited

U.S. PATENT DOCUMENTS

| 4,640,744 A | * | 2/1987 | Howe ............................. 205/687 |
| 7,064,050 B2 |   | 6/2006 | Cabral, Jr. |
| 2010/0203340 A1 | * | 8/2010 | Ruoff et al. .................... 428/408 |

OTHER PUBLICATIONS

Zheng et al., "Metal-catalyzed crystallization of amorphous carbon to graphene," Applied Physics Letters 96, p. 063110 1-3, Feb. 12, 2010.*
Yu et al., "Graphene segregated on Ni surfaces and transferred to insulators," Appl. Phys. Lett. 93, 113103 (2008).
Reina et al., "Large area, few-layer graphene films on arbitrary substrates by chenmical vapor deposition," Nano Letters 9, 30 (2009).
Kim et al. "Large-scale pattern growth of graphene films for stretchable transparent electrodes," Nature Letters 457, 706 (2009).
Leroy et al., "Thin film solid-state reactions forming carbides as contact materials for carbon-containing semiconductors," J. Appl. Phys. 101, 053714 (2007).
Baraton et al., "Growth of graphene films by plasma enhanced chemical vapour deposition," Proc. of SPIE vol. 7399, 73990T (2009).
Zheng et al., "Metal-catalyzed crystallization of amorphous carbon to graphene," Appl. Phys. Lett. 96, 063110 (2010).

* cited by examiner

*Primary Examiner* — Robert Vetere
(74) *Attorney, Agent, or Firm* — Louis J. Percello; Robert M. Trepp

(57) ABSTRACT

A method for forming a single, few-layer, or multi-layer graphene and structure is described incorporating selecting a substrate having a buried layer of carbon underneath a metal layer, providing an ambient and providing a heat treatment to pass carbon through the metal layer to form a graphene layer on the metal layer surface or incorporating a metal-carbon layer which is heated to segregate carbon in the form of graphene to the surface or chemically reacting the metal in the metal-carbon layer with a substrate containing Si driving the carbon to the surface whereby graphene is formed.

13 Claims, 5 Drawing Sheets

US 8,927,057 B2

GRAPHENE FORMATION UTILIZING SOLID PHASE CARBON SOURCES

GOVERNMENT CONTRACT

This invention was made with Government support under Contract No. FA8650-08-C-7838 awarded by Defense Advanced Research Projects Agency (DARPA). The Government has certain rights to this invention.

BACKGROUND

The present invention relates to graphene and more specifically, to one, few, or multi-layer graphene synthesis wherein the graphene is continuous over macroscopic areas (e.g., areas greater than 20 by 20 microns square) and uniform in thickness.

The exceptionally high intrinsic carrier mobility of graphene makes it a potentially promising material for high frequency electronic devices such as low-noise amplifiers for communication applications. The term "graphene" as used herein denotes a one-atom-thick planar sheet of $sp^2$-bonded carbon atoms that are densely packed in a honeycomb crystal lattice. Graphene can be comprised of single-layer graphene (nominally 0.34 nm thick), few-layer graphene (2-10 graphene layers), multi-layer graphene (greater than 10 graphene layers), a mixture of single-layer, few-layer, and multi-layer graphene, or any combination of graphene layers mixed with amorphous carbon (a-C) and/or disordered carbon phases. A disordered carbon phase may be, for example, a crystalline carbon phase with a high density of defects or a nanocrystalline carbon material. Existing methods to prepare the required single-layer or few-layer graphene are far from ideal for commercial use. Graphene from mechanical exfoliation of graphite provides a good quality material, but the yield is low and the inspection requirements are daunting. Graphene layers prepared by thermal treatments of single crystal SiC layers can provide large areas of graphene, but processing is difficult (given the requirements for temperatures in excess of 1100° C.-1200° C.) and the SiC template crystals are expensive and limited in size. Chemical vapor deposition (CVD) methods, in which carbon from a carbon-containing gas is dissolved into the surface of a metal layer at high temperature at about 900° C. to 1000° C. and then converted into surface layers of graphene, also exist. While CVD methods have progressed substantially over the past year, it is still nontrivial to produce few-layer graphene that is continuous over macroscopic areas and uniform in thickness. Once a graphene layer is formed on a substrate, the layer would typically be transferred to another substrate for further use.

SUMMARY

According to one embodiment of the present invention, a method for forming a graphene layer and structure is described comprising selecting a substrate having a first layer including carbon and a second layer including a metal over the first layer, the second layer having an upper surface, providing an ambient, and providing a heat treatment to the substrate in the ambient wherein the heat treatment includes heating to a temperature in the range from 550° C. to 1400° C. whereby carbon in the first layer passes through the second layer to the upper surface and forms a graphene layer on the upper surface.

According to another embodiment of the present invention, a method for forming a graphene layer is described comprising selecting a substrate having an upper surface, forming a carbon-containing metal layer containing at least 50 atomic percent metal on the upper surface, and heating the metal layer to a temperature in the range from 550° C. to 1400° C. whereby carbon segregates out of the metal layer to an upper surface of the metal layer forming a graphene layer on the upper surface.

BRIEF DESCRIPTION OF THE SEVERAL VIEWS OF THE DRAWING

These and other features, objects, and advantages of the present invention will become apparent upon consideration of the following detailed description of the invention when read in conjunction with the drawing in which.

DETAILED DESCRIPTION

Figure 1:
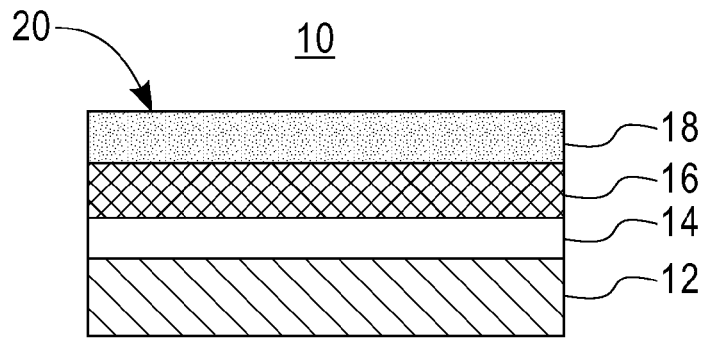
FIG. 1 is a cross section view of a structure comprising a buried carbon source layer and a metal layer on a substrate illustrating a process step.

Referring now to the drawing, FIG. 1 shows a cross section view of structure 10 comprising a base substrate 12 (comprised of, for example, Si or a Si-containing material) having a chemically nonreactive layer 14 (comprised of, for example, silicon dioxide) thereover. If base substrate 12 is Si, chemically nonreactive layer 14 may be a thermal oxide.

A first layer 16 containing a carbon source such as a-C is formed over layer 14, for example, by sputter deposition of carbon. First layer 16 may be for example amorphous carbon, amorphous hydrogenated carbon containing greater than 20 atomic percent C, amorphous hydrogenated carbon containing less than 20 atomic percent H, carbon-containing polymers, carbon-containing materials comprising at least one element selected from the group consisting of Si, O, N and H and carbon-metal alloys containing less than 50 atomic percent of metal and combinations thereof. First layer 16 may have a thickness in the range from 0.5 nm to 50 nm.

Deposition methods for forming first layer 16 containing a carbon source may include spin-on techniques, solution-casting techniques, Chemical Vapor Deposition (CVD), Plasma-Assisted CVD (PACVD), Plasma-Enhanced CVD (PECVD), thermal evaporation, electron-beam evaporation, sputter deposition from a carbon-containing target using an inert or reactive working gas, and ion beam sputtering. Certain carbon-containing layers may require stabilization anneals if they are formed or deposited before a second layer 18 including a metal is formed.

Structure 10 has a second layer 18 including a metal formed over layer 16. Second layer 18 including a metal may include one or more elements selected from the group consisting of Co, Cu, Fe, Ir, Mo, Ni, Pd, Pt, Ru and alloys thereof. Second layer 18 may have a thickness in the range from 10 nm to 1000 nm. Second layer 18 should be thick enough to reduce the likelihood of layer 18 agglomerating and becoming discontinuous. Second layer 18 may be Ni and alloys of Ni which may be formed by physical vapor deposition (PVD) methods, such as, for example, thermal evaporation, electron-beam evaporation, sputtering, and the like. The substrate may be optionally heated during deposition to temperatures up to 500° C. Sputtering is typically performed in a gas ambient at pressures in the range from 10 mTorr to 200 mTorr.

Structure 10 is placed in an ambient which may be, for example, selected from the group consisting of vacuum, $Ar/H_2$, $N_2/H_2$, $N_2$, Ar, He, and mixtures thereof. Structure 10 is given a heat treatment while in the above ambient wherein the heat treatment includes heating structure 10 to a temperature in the range from 550° C. to 1400° C. and more preferably in the range from 850° C. to 1050° C. whereby at least some of the carbon in first layer 16 enters into and passes through second layer 18 to upper surface 20 of layer 18 and forms a graphene layer 22 on upper surface 20 as shown in FIGS. 2A and 2B.

Heat treatments may be performed by various methods known to the art (e.g., furnace annealing, rapid thermal anneal (RTA), and laser annealing), for various time durations, and with various heating and cooling rates. One preferred method of heating is RTA.

Figure 2A:
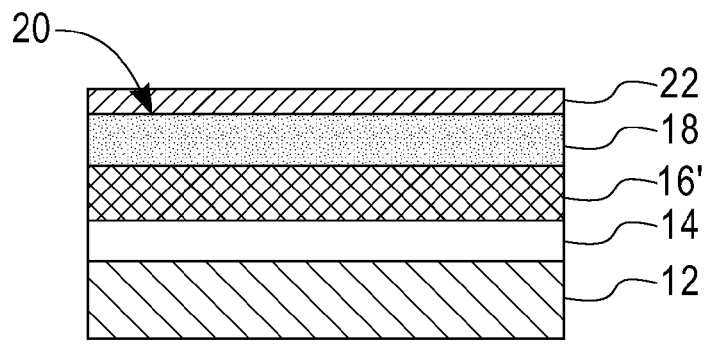
FIGS. 2A and 2B are cross section views of two alternate structures after heating the structure of FIG. 1 in an ambient.
Figure 2B:
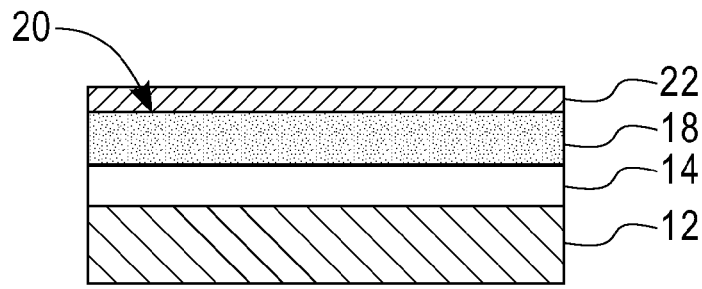

In FIGS. 2A and 2B, graphene layer 22 on upper surface 20 comprises at least one of single layer graphene, few-layer graphene, multi-layer graphene, a mixture of single-layer, few-layer and multi-layer graphene, and any combination of graphene layered mixed with an amorphous carbon phase and any combination of graphene layered mixed with a disordered carbon phase. The embodiments shown in FIGS. 2A and 2B and the heat treatment to the embodiment provides a metal-catalyzed graphene formation process utilizing solid phase sources of carbon contained in first layer 16. In this approach, the carbon is not introduced from the gas phase, but rather from first layer 16. FIG. 2A shows the remaining portion of original carbon source layer 16 as residual carbon source layer 16'. In preferred embodiments, carbon source layer 16 is completely consumed and layer 16' is absent as shown in FIG. 2B. Residual carbon source layer 16' as shown in FIG. 2A may be present after typical heat treatments if the original carbon source layer 16 is very thick (e.g., 400 nm of sputtered carbon).

It should be noted that while carbon source layer 16 and metal-containing layer 18 in FIG. 1 are shown as blanket layers or unpatterned layers, one or both of these layers may be patterned. For example, a patterned carbon source layer 16 may be used in combination with a blanket metal-containing layer 18 to produce graphene layer regions 22 replicating the pattern of carbon source layer 16. Alternatively, a patterned metal-containing layer 18 may be used in combination with a blanket carbon-containing layer 16 to produce graphene layer regions 22 replicating the pattern of metal-containing layer 18.

During heat treatment of the embodiment of FIG. 1, an initial expectation was that graphene would form by a simple dissolution/precipitation mechanism in which C from first layer 16 of amorphous carbon would dissolve into second layer 18 of, for example, Ni during heating and be expelled from solution upon cooling below the solid solubility limit of C in Ni, the mechanism previously seen with graphene growth by CVD. However, the appearance of a surface layer 22 of graphitic carbon after annealing as shown in FIGS. 2A and 2B at temperatures in the range from 550° C. to 750° C. at which the C solubility in Ni is still very low indicates that a metal-induced crystallization and layer exchange mechanism analogous to that seen with Al-induced crystallization of amorphous Si (e.g., as described by O. Nast and S. R. Wenham in J. Appl. Phys. 88, 124 (2000), "Elucidation of the layer exchange mechanism in the formation of polycrystalline silicon by aluminum-induced crystallization") might be more likely. In a metal-induced crystallization and layer exchange mechanism, the dissolved C in Ni would have a low concentration and a high transport rate. Nucleation sites for graphite (typically metal grain boundaries) provide a sink for the dissolved carbon which is replenished by continued dissolution of first layer 16 of amorphous carbon.

For both the amorphous Si/Al stack and the a-C/Ni stack, the driving force for crystallization is thermodynamic stability of the crystalline C or Si phase relative to the amorphous phase.

For a simple dissolution/precipitation mechanism, graphitic carbon would be expected to appear only during the cooling part of heat treatment due to reduced solubility. For a metal-induced crystallization of layer exchange mechanism, graphitic carbon would be expected to appear merely after a sufficient amount of time at a sufficiently elevated temperature. In experiments performed, in situ x-ray diffraction (XRD) during heat treatment or annealing was used to detect the formation of graphitic carbon or graphene, which has a strong 002 reflection corresponding to a d-spacing of 0.34 nm.

Thermally oxidized substrates with an $SiO_2$ thickness of about 300 nm were in situ sputter precleaned and then sequentially coated with amorphous C and Ni by sputter deposition from C and Ni targets in about 10 mTorr Ar. The resulting amorphous C/Ni bilayer or stack samples had amorphous C thicknesses of 3, 10, and 30 nm and a Ni thickness of 100 nm.

In situ XRD measurements during heat treatment (heating and cooling at 3° C./s to or from 1000° C. in He and $N_2/H_2$ (5%) were performed at the National Synchrotron Light Source of the Brookhaven National Laboratory, Upton, N.Y. 11973 (IBM/MIT beamline X-20C) with synchrotron radiation having a wavelength of 0.1797 nm, intensity of $10^{13}$ photons/s, and energy resolution of 1.5%, using a linear detector covering a 2Θ range of ~14° centered around the 002 graphite peak. Additional ex situ Θ-2Θ XRD scans were also performed at room temperature over a wider 2Θ range in a Bragg-Brentano geometry with Cu $K_\alpha$ radiation after rapid thermal anneals (RTAs) with 35° C./s heating rates to 900° C. to 1000° C. in $N_2$ or $Ar/H_2$ (5%), as well as after furnace anneals in $N_2/H_2$ (5%) at 550° C. Raman spectroscopy indicated that the graphitic carbon formed was present as top surface layer 22.

Figure 3:
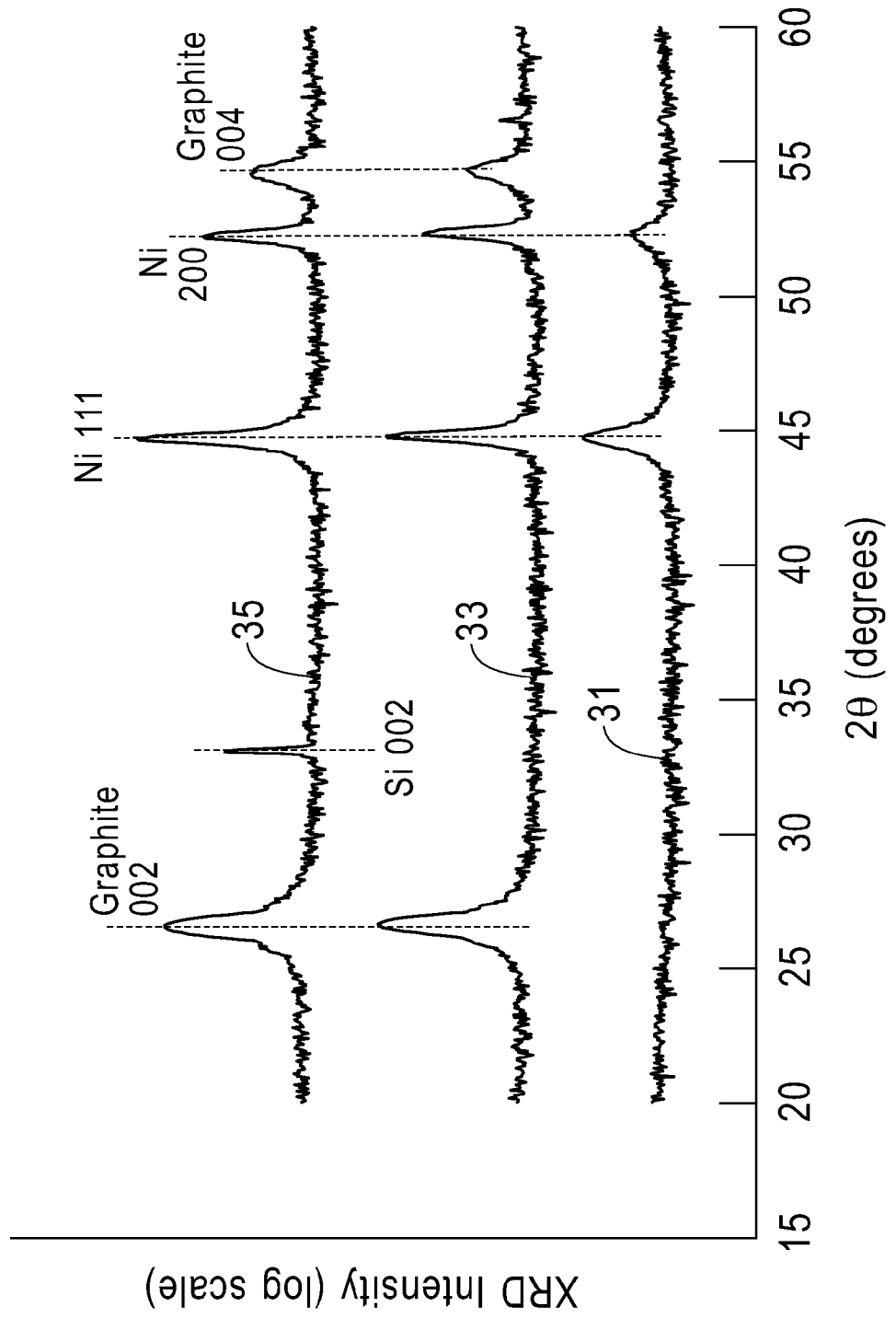
FIG. 3 shows ex situ x-ray diffraction (XRD) data for Si/SiO$_2$/a-C (30 nm)/Ni (100 nm) samples, before and after annealing.
Figure 4:
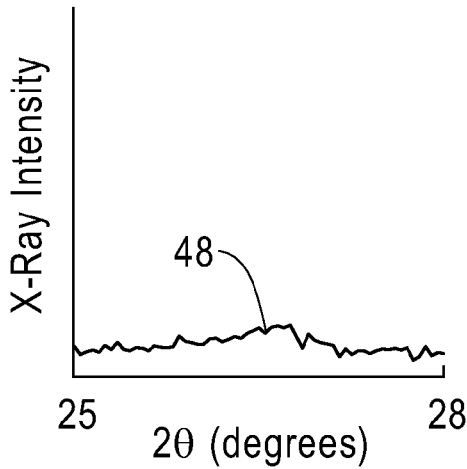
FIGS. 4-9 show ex situ XRD data for the 002 graphite peak after Si/SiO$_2$/a-C/Ni (100 nm) samples with different thicknesses of a-C have been annealed.
Figure 5:
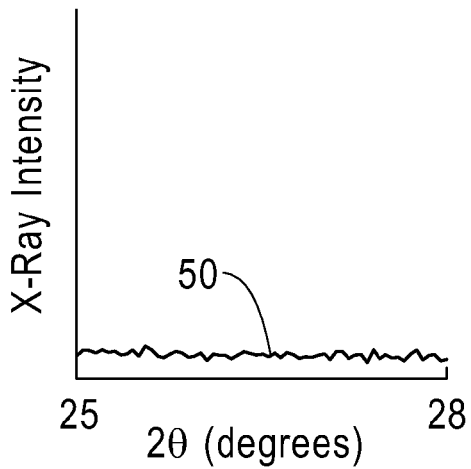
Figure 6:
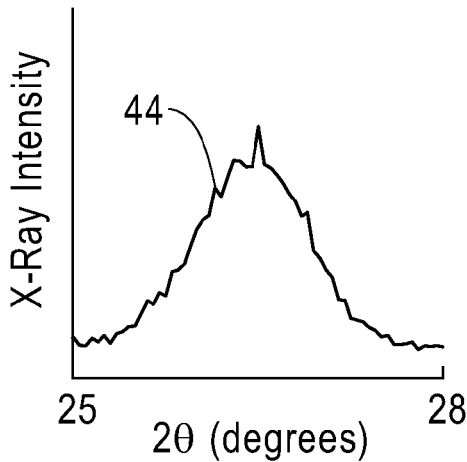
Figure 7:
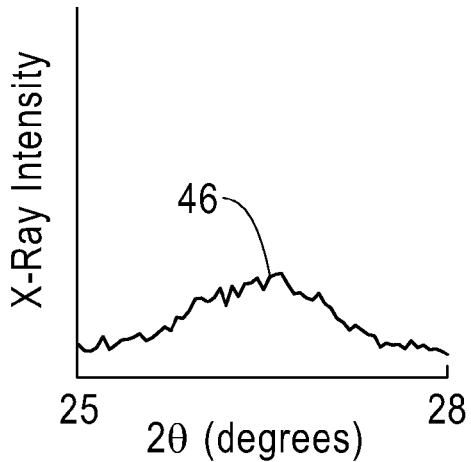
Figure 8:
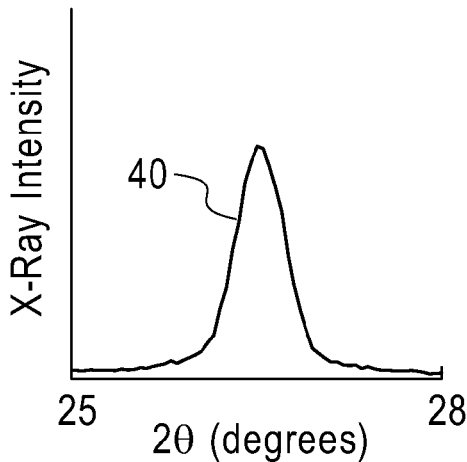
Figure 9:
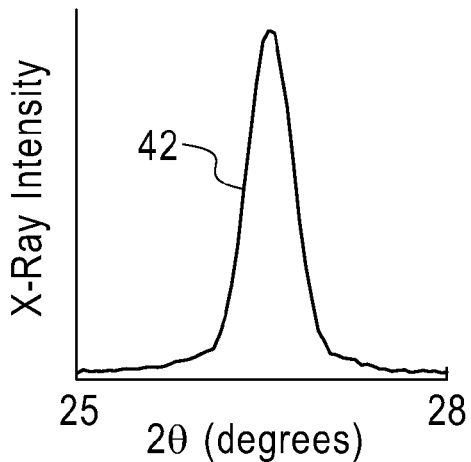

FIG. 3 shows ex situ XRD data for a-C (30 nm)/Ni (100 nm) samples before and after graphite formation induced by 900° C./1 min RTA annealing in $N_2$ or $Ar/H_2$. In FIG. 3, the ordinate represents XRD intensity in log scale and the abscissa represents 2Θ in degrees; arbitrary offsets are included in curves 31, 33, and 35 to provide vertical separation. Curve 31 shows that as-deposited first layer 16 and second layer 18 before annealing, 111 and 200 Ni peaks are present and graphite peaks are absent. After annealing first layer 16 and second layer 18 in an ambient of $N_2$ or $Ar/H_2$ as shown by curve 33 for $N_2$ and 35 for $Ar/H_2$, strong graphite peaks appear and the Ni peaks become stronger and sharper, indicating Ni grain growth The intensities and line shapes of the 002 graphite peak vary with the thickness of the initial a-C layer 16. FIGS. 4-9 show ex situ XRD data for this peak after graphene formation in a-C/Ni (100 nm) samples induced by RTA annealing in $N_2$ or $Ar/H_2$, where the RTA anneal comprises a ramp up at 35° C./s to 1000° C., a hold at 1000° C. for 10 s, and a "free fall" cool down to room temperature. In FIGS. 4 and 5, first layer 16 is 3 nm thick. In FIGS. 6 and 7, first layer 16 is 10 nm thick. In FIGS. 8 and 9, first layer 16 is 30 nm thick. In FIGS. 4, 6, and 8, the ambient is $N_2$. In FIGS. 5, 7, and 9 the ambient is $Ar/H_2$. In FIGS. 4-7, the ordinate represents x-ray intensity in linear scale. In FIGS. 8 and 9, the ordinate represents x-ray intensity in linear scale divided by 5. In FIGS. 4-9, the abscissa represents 2Θ in degrees. The peak intensities are strongest for the a-C (30 nm) samples shown by curve 40 in FIG. 8 and curve 42 in FIG. 9, about a factor of 10 lower for the a-C (10 nm) samples shown by curve 44 in FIG. 6 and curve 46 in FIG. 7, and almost below the detection limit for the a-C (3 nm) samples shown by curve 48 in FIG. 4 and curve 50 in FIG. 5. Similar results were seen for 950° C./1 min anneals in the same ambient. The full width half maximum (FWHM) values $\Delta(2\Theta)$ for peaks of the amorphous C (10 nm) samples of FIGS. 6 and 7) (~1.1°) are about twice those for the a-C (30 nm) samples of FIGS. 8 and 9. The implied crystallite sizes (computed from $\lambda/[\cos(\Theta_B)*\Delta(2\Theta_B)]$ with the Bragg angle $\Theta_B$ in radians are 13 and 32 nm, respectively, in good agreement with the initial a-C thicknesses of 10 nm and 30 nm.

Figure 10:
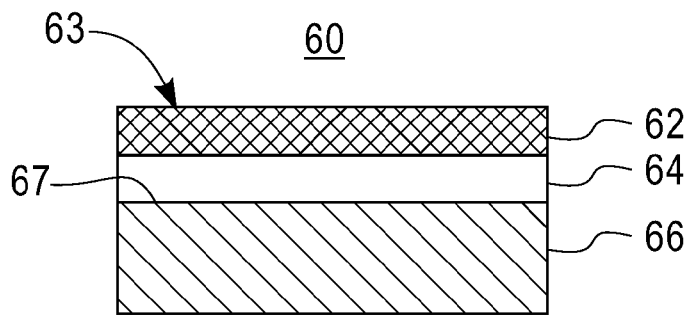
FIG. 10 is a cross section view of a structure comprising a metal-carbon layer over a nonreactive substrate.

Graphene may also be formed from metal-carbon alloy layers. FIG. 10 shows a cross section view of a structure 60 comprising layer 62 of a metal-carbon alloy on a chemically nonreactive layer 64. Nonreactive layer 64 is formed on surface 67 of substrate 66. Layer 62 has an upper surface 63. Metal-carbon alloy layer 62 has a metal content comprising at least 50 atomic percent and a carbon content in the range from 0.3 to 50 atomic percent. Metal-carbon alloy layer 62 may be one metal-carbon layer with a constant carbon content, a thickness-graded carbon content, a stepped carbon content with low C content in a lower portion of the metal layer and a high C content in an upper portion of the metal layer wherein the low carbon content is in the range from 0 to 3 atomic percent and the high C content would be in the range from 1 to 10 atomic percent, a stepped carbon content with low C content in an upper portion of the metal layer and a high C content in a lower portion of the metal layer wherein the low C content is in the range from 0 to 3 atomic percent and the high C content is in the range from 1 to 10 atomic percent. Metal-carbon alloy layer 62 has a thickness in the range from 50 nm to 5000 nm. Metal-carbon alloy layer 62 may include a plurality of carbon-containing metal layers.

Metal-carbon alloy layer 62 may be deposited by a variety of methods including PVD methods. Preferred PVD methods include sputtering from metal-carbon alloy targets and co-sputtering from separate targets of metal and carbon.

Figure 11:
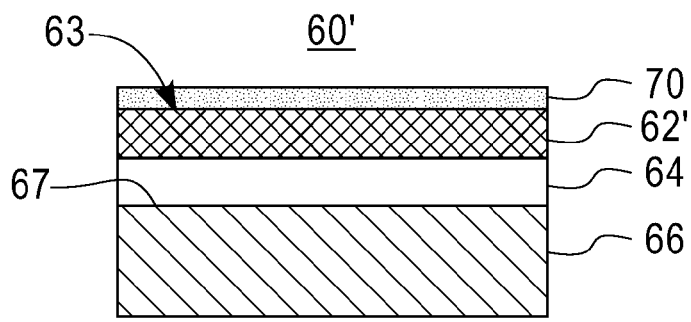
FIG. 11 is a cross section view of the structure of FIG. 10 after heating to form a graphene layer.

The metal in metal-carbon alloy layer 62 may be, for example, Ni in a metal-carbon alloy NiC containing at least 50% Ni. NiC may be deposited on layer 64 and then annealed to segregate out carbon on surface 63 of layer 62' to form layer 70 comprising few-layer graphene of structure 60' as shown in FIG. 11. The metal-carbon layer 62 may include one or more metals and may include Si. Nonreactive layer 64 may be, for example, silicon dioxide or aluminum oxide. If substrate 66 is Si or Si-containing, non-reactive layer 64 may be a thermal oxide of silicon.

Structure 60 or more particularly layer 62 is heated to a temperature in the range from 550° C. to 1400° C. and more preferably from 850° C. to 1050° C. whereby carbon segregates out of layer 62 to upper surface 63 of layer 62 forming layer 70 of graphene on surface 63. This inventive method is expected to offer better thickness control for layer 70 than CVD methods because the amount of graphene formed is self-limited by the finite amount of carbon in metal-carbon layer 62, an amount which is fixed by the layer's atomic percent of C and the thickness of layer 62.

Experiments were performed providing data for 100 nm thick NiC where C equals 0, 1, 3, and 10 atomic percent which was deposited on thermal oxide layer 64 of structure 60 by a co-sputtering deposition process. Various measurements techniques including sheet resistance (Rs), Raman spectroscopy, x-ray diffraction, and optical reflectance were used to characterize layer 62 as deposited and layer 70 after anneals for 1 minute in $N_2$ at 500° C., 650° C., 750° C., and 900° C. Graphitic carbon (graphene) was found after annealing at or above 900° C.

Numerous variations of the above-described starting structures for graphene formation from solid phase carbon sources are possible. For example, variations of the bilayer carbon-source/metal structure of FIG. 1 may further include additional carbon-source/metal bilayers or, as shown in FIG. 12, a metal layer under the carbon-source layer.

Figure 12:
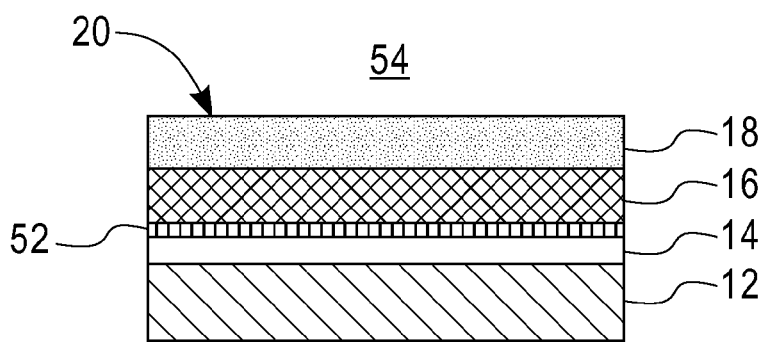
FIG. 12 is a cross section view of the structure of FIG. 1 further including a second metal layer formed below a buried carbon source layer.

FIG. 12 shows a cross section view of the structure of FIG. 1 further including a second metal layer formed below a buried carbon source layer. Structure 54 includes metal layer 52 inserted below carbon-source layer 16 and over layer 14 and includes one or more metals selected from the group consisting of Co, Cu, Fe, Ir, Mo, Ni, Pd, Pt, Ru and alloys thereof. Metal layer 52 functions to absorb carbon from layer 16 and may have a thickness in the range from 10 nm to 1000 nm.

In variations of the metal-carbon alloy structure 60 of FIG. 10, additional metal layers may be included above or below the metal-carbon alloy layer. Additional metal layers give the structure the advantages of a thicker metal (larger metal grains and a lower likelihood of agglomeration) while not increasing the structure's total carbon content.

Figure 13:
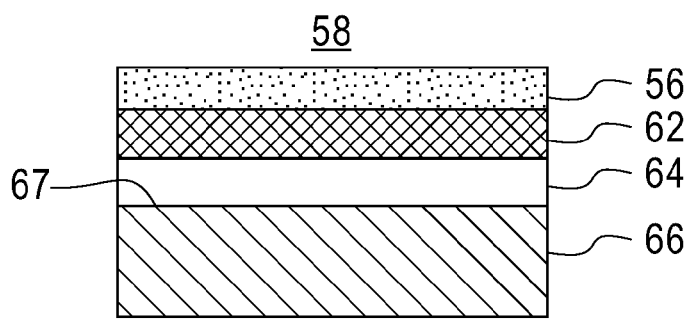
FIG. 13 is a cross section view of the structure of FIG. 10 further including a metal layer formed above a metal-carbon layer.
Figure 14:
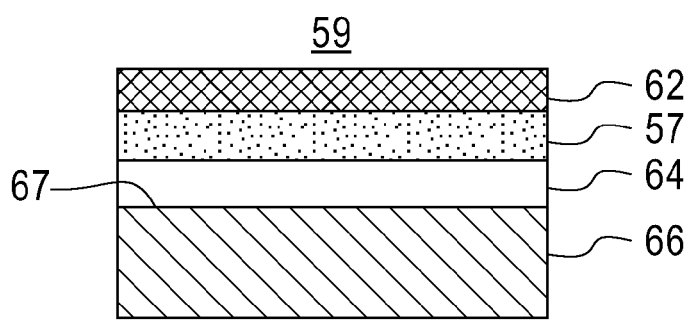
FIG. 14 is a cross section view of the structure of FIG. 10 further including a metal layer formed below a metal-carbon layer.

FIG. 13 shows a cross section view of the structure of FIG. 10 further including metal layer 56 above layer 62 to form structure 58. FIG. 14 shows a cross section view of FIG. 10 further including metal layer 57 below layer 62 and above layer 64 to form structure 59. In FIGS. 13 and 14, like reference numerals are used for functions corresponding to the apparatus of FIG. 10. Metal layer 56 in FIG. 13 and metal layer 57 in FIG. 14 may be a metal that is used in metal-carbon alloy layer 62. For example, metal layers 56 and 57 may be Ni and metal-carbon alloy layer 62 may be Ni—C. Metal layers 56 and 57 may have a thickness in the range from 50 nm to 5000 nm and may be initially substantially carbon free prior to a heat treatment to form graphene on the top surface of the structures 58 and 59, respectively.

In an alternate embodiment of the invention, surface segregation and graphitization of carbon in a metal-carbon alloy may be facilitated by disposing the metal-carbon alloy layer on a substrate layer that can chemically react with the metal.

Figure 15:
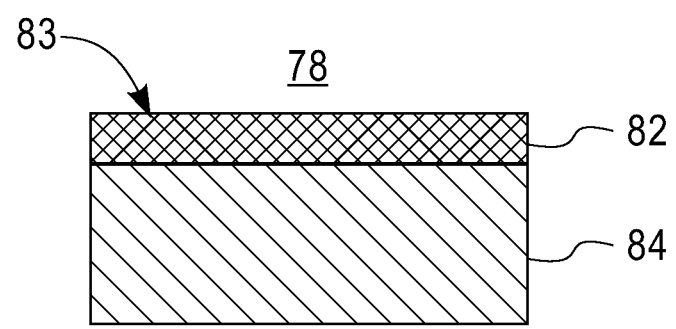
FIG. 15 is a cross section view of a structure comprising a metal-carbon layer over a reactive substrate.
Figure 16:
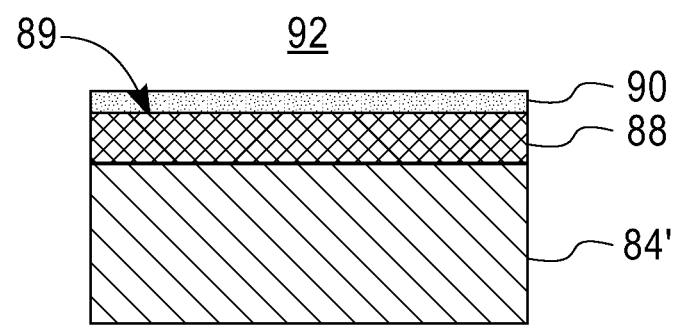
FIG. 16 is a cross section view of the structure of FIG. 15 after heating to form a graphene layer.

FIG. 15 shows a cross section view of structure 78 comprising layer 82 of metal-carbon alloy on a reactive Si-containing substrate 84. Metal-carbon alloy layer 82 comprises at least 50 atomic percent metal and has an upper surface 83. Metal-carbon alloy layer 82 is heated to a temperature in the range from 550° C. to 1400° C. and more preferably 850° C. to 1050° C. whereby metal in metal-carbon alloy layer 82 chemically reacts with Si of substrate 84 to form substrate 84' and a chemical compound layer 88 which drives carbon in layer 82 to upper surface 89 of layer 88 to form layer 90 of graphene in structure 92 as shown in FIG. 16. In FIG. 15, substrate 84 may be Si (or a Si layer on a nonreactive layer such as $SiO_2$) and layer 82 may contain Ni which will chemically react to form $NiSi_x$ as layer 88 of structure 92 shown in FIG. 16.

In FIGS. 1-16, like references are used for functions corresponding to the apparatus of an earlier figure.

While there has been described and illustrated a method for forming graphene and structure by selecting a substrate having a first layer including carbon and a second layer including a metal over the first layer and providing a heat treatment in an ambient to a temperature in the range from 550° C. to 1400° C. whereby at least some of the carbon in the first layer passes through the second layer to the upper surface of the second layer whereby graphene is formed and a method for forming graphene by selecting a substrate having an upper surface, forming a carbon-containing metal layer on the surface and heating the metal layer to a temperature in the range from 550° C. to 1400° C. whereby carbon segregates out of the metal layer to the upper surface of the metal layer whereby graphene is formed or chemically reacting the metal in the metal-carbon layer with a substrate containing Si driving the carbon to the surface whereby graphene is formed, it will be apparent to those skilled in the art that modifications and variations are possible without deviating from the broad scope of the invention which shall be limited solely by the scope of the claims appended hereto.

What is claimed is:

1. A method for forming a graphene layer comprising:
   selecting a substrate having a first layer including carbon and a second layer including a metal over said first layer, said second layer having an upper surface,
   providing an ambient, and
   providing a heat treatment to said substrate in said ambient wherein said heat treatment includes heating to a temperature in the range from 550° C. to 1400° C. whereby at least some of said carbon in said first layer passes through said second layer to said upper surface and forms said graphene layer on said upper surface.

2. The method of claim 1 wherein said carbon includes sputtered carbon.

3. The method of claim 1 wherein said graphene layer on said upper surface comprises at least one of single layer graphene, few-layer graphene, multi-layer graphene, a mixture of single-layer, few-layer and multi-layer graphene, any combination of graphene layers mixed with an amorphous carbon phase and any combination of graphene layers mixed with a disordered carbon phase.

4. The method of claim 1 wherein said ambient is selected from the group consisting of vacuum, $Ar/H_2$, $N_2/H_2$, $N_2$, Ar, He, and mixtures thereof.

5. The method of claim 1 wherein said metal includes one or more elements selected from the group consisting of Co, Cu, Fe, Ir, Mo, Ni, Pd, Pt, Ru and alloys thereof.

6. The method of claim 1 wherein said first layer including carbon is selected from the group consisting of amorphous carbon, amorphous hydrogenated carbon containing greater than 20 atomic percent C, amorphous hydrogenated carbon containing less than 20 atomic percent H, carbon-containing polymers, carbon-containing materials comprising at least one element selected from the group consisting of Si, O, N and H and carbon-metal alloys containing less than 50 atomic percent of metal.

7. The method of claim 1 wherein said temperature is in the range from 850° C. to 1050° C.

8. The method of claim 1 wherein said first layer has a thickness in the range from 0.5 nm to 50 nm.

9. The method of claim 1 wherein said second layer has a thickness in the range from 10 nm to 5000 nm.

10. A method for forming a graphene layer comprising:
    selecting a substrate having a first layer including carbon and a second layer including a metal over said first layer, said second layer having an upper surface,
    providing an ambient, and providing a heat treatment to said substrate in said ambient wherein said heat treatment includes heating to a temperature in the range from 550° C. to 1400° C. whereby at least some of said carbon in said first layer passes through said second layer to said upper surface and forms said graphene layer on said upper surface wherein said metal includes Ni and alloys of Ni.

11. A method for forming a graphene layer comprising:
    selecting a substrate having a first layer including carbon and a second layer including a metal over said first layer, said second layer having an upper surface,
    providing an ambient, and
    providing a heat treatment to said substrate in said ambient wherein said heat treatment includes heating to a temperature in the range from 550° C. to 1400° C. whereby at least some of said carbon in said first layer passes through said second layer to said upper surface and forms said graphene layer on said upper surface wherein said selected substrate further includes a third layer including a metal under said first layer.

12. A method for forming a graphene layer comprising:
    selecting a substrate having a first layer including carbon and a second layer including a metal over said first layer, said second layer having an upper surface,
    providing an ambient, and
    providing a heat treatment to said substrate in said ambient wherein said heat treatment includes heating to a temperature in the range from 550° C. to 1400° C. whereby at least some of said carbon in said first layer passes through said second layer to said upper surface and forms said graphene layer on said upper surface wherein said carbon-containing first layer is patterned, said second layer including metal is a blanket layer.

13. A method for forming a graphene layer comprising:
    selecting a substrate having a first layer including carbon and a second layer including a metal over said first layer, said second layer having an upper surface,
    providing an ambient, and
    providing a heat treatment to said substrate in said ambient wherein said heat treatment includes heating to a temperature in the range from 550° C. to 1400° C. whereby at least some of said carbon in said first layer passes through said second layer to said upper surface and forms said graphene layer on said upper surface wherein said carbon-containing first layer is a blanket layer, said second layer including metal is patterned.

* * * * *